United States Patent [19]
Ishibashi et al.

[11] Patent Number: 5,087,868
[45] Date of Patent: Feb. 11, 1992

[54] ROTARY ACTUATOR

[75] Inventors: Takehisa Ishibashi; Shinobu Kakizaki; Yoshiaki Watanabe; Fukashi Kanai, all of Atsugi, Japan

[73] Assignee: Atsugi Motor Parts Company, Ltd., Kanagawa, Japan

[21] Appl. No.: 563,866

[22] Filed: Aug. 7, 1990

Related U.S. Application Data

[60] Continuation of Ser. No. 171,011, Mar. 21, 1988, abandoned, which is a division of Ser. No. 115,249, Oct. 30, 1987, Pat. No. 4,776,437.

[30] Foreign Application Priority Data

| Oct. 31, 1986 | [JP] | Japan | 61-167849 |
| Oct. 31, 1986 | [JP] | Japan | 61-259985 |
| Feb. 16, 1987 | [JP] | Japan | 62-21084 |
| Feb. 16, 1987 | [JP] | Japan | 62-33121 |

[51] Int. Cl.⁵ ............................. F16F 9/50; H02P 8/00
[52] U.S. Cl. .................... 318/696; 318/126; 310/268; 280/707; 188/299; 188/319
[58] Field of Search ............... 318/119, 122, 126, 127, 318/138, 254, 685, 696; 310/36, 237, 268; 335/229; 280/707, 714; 251/129.01, 129.02, 129.04, 129.11, 129.12; 188/285, 299, 319

[56] References Cited

U.S. PATENT DOCUMENTS

| 3,070,730 | 12/1962 | Gray et al. | 335/229 |
| 3,124,731 | 3/1964 | Eysen et al. | 310/36 X |
| 3,912,956 | 10/1975 | Muller | 310/268 X |
| 4,072,881 | 2/1978 | Ban | 318/138 |
| 4,174,484 | 11/1979 | Schmider | 310/268 X |
| 4,199,265 | 4/1980 | Sanderson et al. | 366/274 |
| 4,246,504 | 1/1981 | Clifford et al. | 310/268 X |
| 4,275,371 | 6/1981 | Vogel | 335/229 |
| 4,313,529 | 2/1982 | Kato et al. | 188/299 |
| 4,345,228 | 8/1982 | Idogaki et al. | 335/229 X |
| 4,455,516 | 6/1984 | Furusho | 318/254 |
| 4,466,625 | 8/1984 | Kondo et al. | 280/707 X |
| 4,527,676 | 7/1985 | Emura et al. | 188/299 |
| 4,546,338 | 10/1985 | Idogaki et al. | 251/129.11 |
| 4,600,871 | 7/1986 | Idogaki et al. | 335/229 X |
| 4,617,499 | 10/1986 | Yuasa | 318/138 |
| 4,691,135 | 9/1987 | Sogabe et al. | 251/129.11 |
| 4,891,537 | 1/1990 | Shiraki et al. | 310/268 X |

FOREIGN PATENT DOCUMENTS 0157181 6/1985 European Pat. Off. .
2112104 3/1982 United Kingdom .

OTHER PUBLICATIONS

C. J. Waldspurger, et al., "New Design Options With Rare Earth Magnets", Machine Design, Sep. 1984, pp. 115–118.

Primary Examiner—Bentsu Ro
Attorney, Agent, or Firm—Bachman & LaPointe

[57] ABSTRACT

A rotary actuator is designed for rotatingly drive a rotary body, such as a rotary valve member for adjusting damping force to be created by a variable damping force shock absorber. The rotary actuator takes a layout of a permanent magnet and an electromagnet arranged in vertically spaced relationship. Vertical layout of the permanent magnet and the electromagnet reduces plane area required for installation.

13 Claims, 7 Drawing Sheets

FIG.10
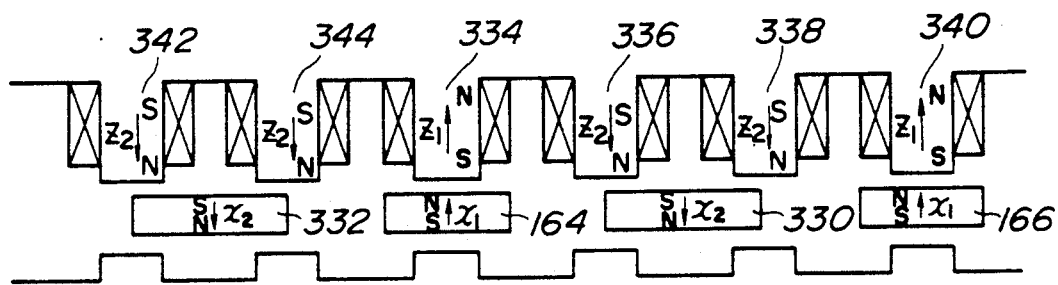
FIG.11  FIG.12  FIG.13
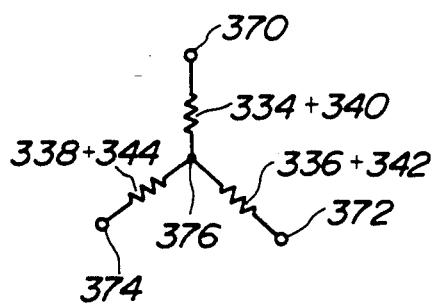  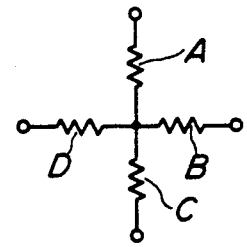

ROTARY ACTUATOR

This application is a continuation of application Ser. No. 07/171,011, filed Mar. 21, 1988, now abandoned, which is a division of application Ser. No. 07/115,249, filed Oct. 30, 1987, now U.S. Pat. No. 4,776,437.

BACKGROUND OF THE INVENTION

1. Field of the Invention

The present invention relates generally to a rotary-type actuator which is designed for rotatingly driving a member to be driven and compact for convenient installation. More particularly, the invention relates to a rotary actuator applicable for a variable damping force shock absorber assembly which is variable of damping characteristics.

2. Description of the Background Art

In the recent years, there have been developed various constructions of variable damping force shock absorber assemblies which is variable of damping characteristics for facilitating variable suspension characteristics in an automotive suspension system. Among such various constructions of variable damping force shock absorber assemblies, some of the shock absorber assemblies includes rotary valves to be rotatingly driven for varying flow resistance against working fluid in the shock absorbers and whereby adjusting damping characteristics. Such rotary valve-type variable damping force shock absorber assemblies have been disclosed in the U.S. Pat. No. 4,600,215, issued on July 15, 1986, to Kuroki et al, for example. In the shown construction, the rotary valve member defines a plurality of orifices respectively having different path areas for varying flow rate of the working fluid to flow between upper and lower fluid chambers in the shock absorber. The rotary valve member, as driven, varies angular position to establish fluid communication between the aforementioned upper and lower fluid chambers of the shock absorber through one of the orifices. With this construction, flow restriction magnitude for the working fluid is variable depending upon the angular position of the rotary valve member for varying the damping characteristics of the variable damping force shock absorber assembly.

On the other hand, in order to drive the rotary valve member for adjusting the damping characteristics, an electromagnetically operable actuator may be provided in the shock absorber assembly. One of the examples of such electromagnetically operable actuator has been disclosed in the Japanese Utility Model First (unexamined) Publication (Jikkai) Showa 58-72546. The actuator disclosed in the above-identified Japanese Utility Model First Publication, comprises a stationary table fixed onto the top of a piston rod, an actuation rod drivingly connected to the rotary valve member, a rotor having permanent magnets and fixed to the actuation rod, and a stator which has a plurality of electromagnets. The electromagnets are arranged at positions radial outside of the permanent magnet and designed to be selectively energized for driving the rotor.

Such layout of the magnets in the actuator is so bulky to require substantial space for installation. This may raise incovenience to install the actuator on the top of the strut tower of the vehicular suspension, since it tends to interfere installation of other vehicular equipments.

On the other hand, in order to precisely adapt the damping characteristics of the shock absorber assembly to the vehicular driving condition or to obtain good response characteristics in adjustment of the damping characteristics, sufficient rotational torque of the actuator is required for quickly drive the actuation rod and the valve member, instantly. In order to obtain bigger torque, area of the permanent magnet is to be expanded, the radial length of the permanent magnet is to be lengthened and/or the magnetic field of the electromagnet is strengthened. This means that greater torque to obtain may require larger size of the actuator to increase inconvenience in installation on the vehicle.

SUMMARY OF THE INVENTION

Therefore, it is an object of the present invention to provide a rotary-type actuator which can solve the aforementioned problems in the conventional art.

Another object of the invention is to provide a rotary-type actuator, particularly adapted for an automotive variable damping force shock absorber assembly for driving a rotary valve for adjusting damping characteristics.

A further object of the invention is to provide a rotary actuator which is powerful and compact to be conveniently installed in a limited space.

In order to accomplish the aforementioned and other objects, a rotary actuator, according to the present invention, takes a layout of a permanent magnet and an electromagnet arranged in vertically spaced relationship. Vertical layout of the permanent magnet and the electromagnet reduces plane area required for installation.

According to one aspect of the invention, a rotary actuator for rotatingly driving a rotatable member, comprises a rod member connected to a rotatable member for rotation therewith, a rotor assembly including a permanent magnet having a first pole at first side and a second pole at second side thereof, the permanent magnet being associated with the rod member for rotatingly drive the latter according to angular displacement thereof, a stator assembly provided essentially in alignment with the rotor assembly along the axis of the rod member and opposing to the first side of the permanent magnet, the stator assembly including a plurality of electromagnets which are arranged at axially spaced apart relationship with the permanent magnet with a predetermined clearance in a direction of the axis of the rod member, each of the electromagnets being adapted to be energized to have the second pole at the side adjacent the permanent magnet and the first pole at the side remote from the permanent magnet, and switch means for selectively energizing the electromagnets for rotatingly driving the permanent magnet with the rotatable member via the rod member.

By arranging the rotor assembly and the stator assembly of the rotary actuator, plane area required for installation of such actuator can be significantly reduced for convenience of installation.

In the preferred construction, the rotor assembly includes a plurality of permanent magnets respectively having first poles at the first sides and second poles at the second sides, and the electromagnets of the stator assembly forms groups, the electromagnets in each group being oriented at angular positions to be placed in alignment with the corresponding one of permanent magnets when one of the permanent magnets in the same group is axially aligned with one of the permanent magnets. The groups of electromagnets are respectively arranged at predetermined angular positions corresponding to the desired angular positions of the rotatable member.

On the other hand, the rotor assembly may further comprise an auxiliary permanent magnet having the second pole at its first side and the first pole at its second side, the auxiliary permanent magnet being arranged at the angular position circumferentially shifted from the permanent magnet having first pole at the first side and second pole at the second side for creating rotational torque for driving the rotatable member via the rod member by repulsion between the second pole of the first side thereof and the second pole of the energized electromagnet. In this case, the electromagnets are designed to be controlled electric current flow direction by the switch means in such a manner that when one of the electromagnets is energized to form the second pole at the side adjacent the rotor assembly and first pole at the side remote from the rotor assembly, the other electromagnet located adjacent the one of electromagnets is energized to have first pole at the side adjacent the rotor assembly and second pole at the side remote from the rotor assembly. Each of the electromagnets are connected to an electric power source via the switch means at one terminal and are commonly connected to the ground at the other terminal.

According to another aspect of the invention, a variable damping force shock absorber for an automotive suspension system, comprises a shock absorber cylinder defining a fluid chamber therein, which shock absorber cylinder is disposed between sprung mass and unsprung mass of the automotive suspension system, a piston disposed within the fluid chamber of the shock absorber cylinder and dividing the fluid chamber into upper first and lower second pressure chambers, a piston rod connecting the piston to one of the sprung and unsprung mass for causing thrusting movement along the shock absorber cylinder, fluid communication path means defining a fluid communication path for establishing fluid communication between the first and second pressure chambers, a rotary valve member disposed within the fluid communication path for adjusting path area of the fluid communication path for whereby adjusting damping characteristics of the shock absorber, an actuator drivingly associated with the rotary valve for rotatingly drive the rotary valve member for varying damping characteristics, the actuator including a rotor assembly having a permanent magnet establishing a magnetic field including a axial component directed in first axial direction substantially parallel to the axis of the piston rod, and a stator assembly having a plurality of electromagnets arranged in opposition to the rotor assembly and axially spaced position, the electromagnets being circumferentially arranged at angular positions respectively corresponding to the predetermined positions of the rotary value for predetermined damping characteristics, the electromagnets generating magnetic field as energized to have a component directed in the first direction for drawing the permanent magnet for driving the rotary valve at one of predetermined angular position, and a mode selector means associated with the actuator, for selecting one of a plurality of damping characteristics modes and for selectively energizing one of the electromagnets corresponding to selected one of damping characteristics modes.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 10 is an explanatory illustration showing magnetical relationship between permanent magnets and electromagnets to be employed in the third embodiment of the rotary actuator;

FIG. 11 is an illustration of the internal circuit showing connection of an electromagnet employed in the third embodiment of the driver circuit for the rotary actuator of the present invention;

FIGS. 12 and 13 are modifications of the internal circuits of the electromagnet to be employed in the actuator of the present invention.

DESCRIPTION OF THE PREFERRED EMBODIMENT

Figure 1:
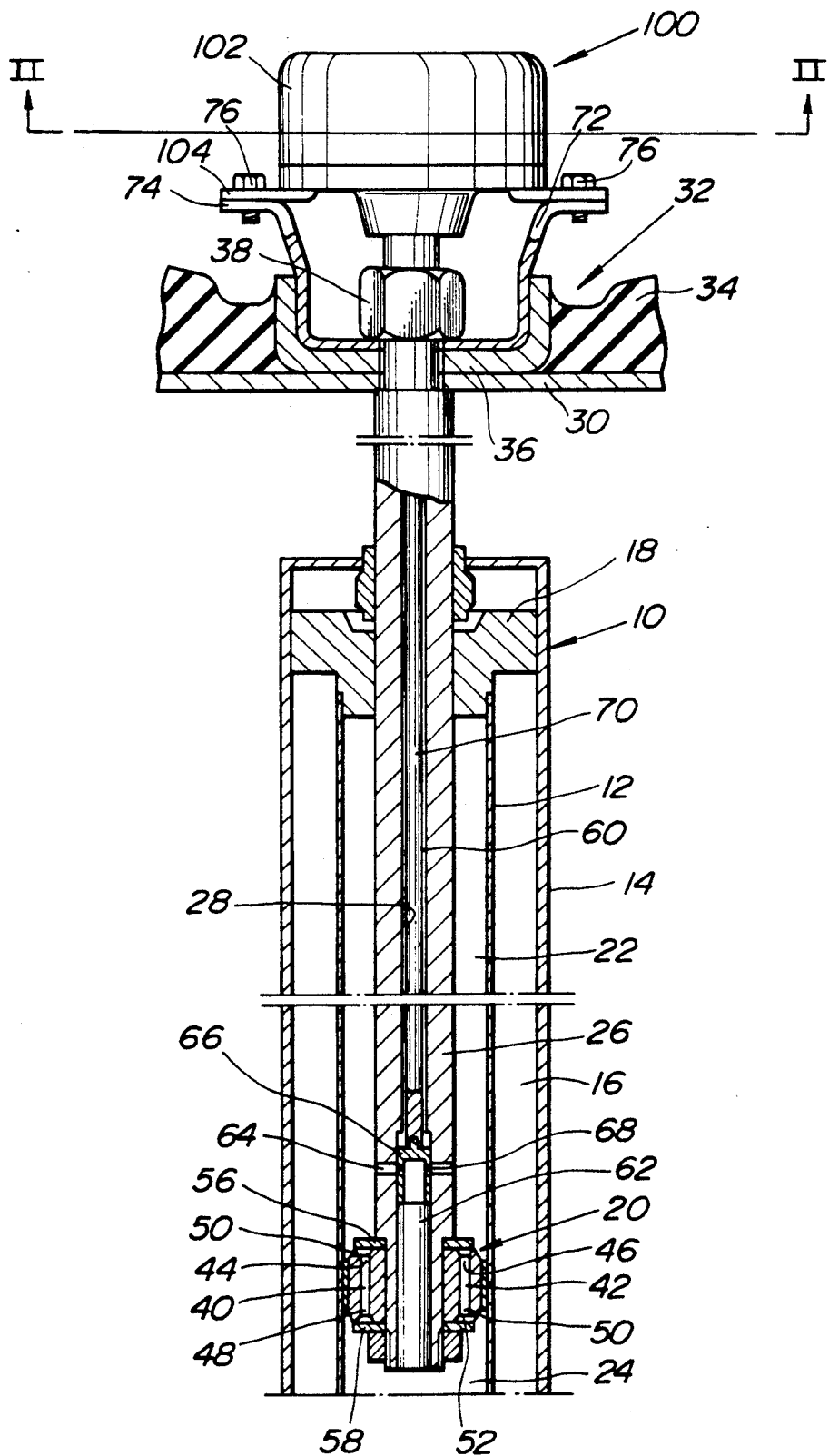
FIG. 1 is a fragmentary sectional view of one example of a variable damping force shock absorber assembly, to which the preferred embodiment of a rotary actuator according to the present invention is applied.

Referring now to the drawings, particularly to FIG. 1, a rotary actuator which is generally represented by the reference numeral '100' is employed in a variable damping force or damping characteristics adjustable hydraulic shock absorber which is generally represented by the reference numeral '10'. In the shown example, the variable damping force shock absorber 10 comprises a double-action type hydraulic shock absorber which has coaxially arranged inner and outer cylinders 12 and 14. The inner cylinders 12 is disposed in the outer cylinder 14 to define therebetween an annular fluid chamber 16. The annular fluid chamber 16 defined between the inner and outer cylinders 12 and 14 is in communication with an internal chamber of the inner cylinder 12 in a per se well known manner. The top end of the inner cylinder 12 is sealingly closed by a end plug 18 in a liquid-tight fashion. A thrusting piston 20 is slidably disposed within the internal chamber of the inner cylinder 12 to divide the chamber into upper and lower pressure chambers 22 and 24. The upper and lower pressure chambers 22 and 24 and the fluid reservoir chamber 16 are filled with hydraulic working fluid.

The piston 20 is rigidly secured at the lower end of a piston rod 26 which is in a hollow cylindrical form to define an axially extending through opening generally being represented by the reference numeral '28'. The upper end of the piston is connected to the upper end wall 30 of a strut housing defined in the vehicle body. An upper mount insulator assembly 32 is interposed between the top end of the piston rod 26 and the upper end wall 30 in order to absorb high frequency vibration energy transmitted from the piston rod to the vehicle body so that uncomfortable high frequency road shock input through vehicular wheel cannot be transmitted to the vehicle body. The upper mount insulator assembly 32 generally comprises an insulator rubber 34 and a collar 36. The upper mount insulator assembly 32 is rigidly secured to the upper end wall 30 of the strut housing by means of fastening nut 38 together with the top end of the piston rod 26.

Though it is not shown in the accompanying drawings, the outer cylinder 14 is connected to a suspension member, such as suspension link, suspension arm and so forth in a per se well known manner. Therefore, the shock absorber is disposed between the vehicle body and the suspension member for absorbing shock to be transmitted between the vehicle body and the suspension member. Since the shown embodiment employs the double-action type shock absorber, shock absorbing damping force may be created in the bounding and rebounding strokes of the piston 26.

The piston 26 is formed with a plurality of axially extending fluid path openings 40 and 42, each having the upper end opening 44, 46 toward the upper pressure chamber 22 and the lower end opening 48, 50 toward the lower pressure chamber 24. As seen from FIG. 1, the piston 26 is formed with a recess 50 adjoining the upper end 44 of the fluid path opening 40 on the upper surface directed to the upper pressure chamber 22, and a recess 52 adjoining the lower end 50 of the fluid path opening 42 on the lower surface of the piston. Disc-shaped valve members 56 and 58 are attached on the upper and lower surfaces of the piston. The disc-shaped valve member 56 is so designed as to openably close the upper end 46 of the fluid path opening 42 and the disc-shaped valve member 58 openably closes the lower end 48 of the fluid path opening 40. On the other hand, because of presence of the recesses 50 and 52, the upper end 44 of the fluid path opening 40 and the lower end 50 of the fluid path opening 42 are constantly held open.

Therefore, in the piston compression stroke (downward stroke), the working fluid pressure in the lower pressure chamber 24 as compressed by downward movement of the piston flows from the lower pressure chamber to the upper pressure chamber 22 via the fluid path opening 42. During the flow of the working fluid through the fluid path opening 42, the disc-shaped valve member 56 is pushed upwardly to open the upper end 46 to allow the working fluid in the fluid path opening 42 to flow into the upper fluid chamber 22. At this time, since the working fluid pressure in the lower pressure chamber 24 is higher than that in the upper pressure chamber, the disc-shaped valve member 58 is held at the position sealingly closing the lower end 48 of the fluid path opening 40 to block fluid communication between the upper and lower pressure chambers 22 and 24 therethrough. On the other hand, piston expansion stroke (upward stroke), the working fluid pressure in the upper pressure chamber 22 as compressed by downward movement of the piston flows from the lower pressure chamber to the lower pressure chamber 24 via the fluid path opening 40. During the flow of the working fluid through the fluid path opening 40, the disc-shaped valve member 58 is pushed downwardly to open the lower end 48 to allow the working fluid in the fluid path opening 50 to flow into the lower fluid chamber 24. At this time, since the working fluid pressure in the upper pressure chamber 22 is higher than that in the lower pressure chamber 24, the disc-shaped valve member 56 is held at the position sealingly closing the lower end 46 of the fluid path opening 42 to block fluid communication between the upper and lower pressure chambers 22 and 24 therethrough.

The through opening 28 of the piston rod 26 is divided into an upper smaller diameter section 60 and a lower larger diameter section 62. One or more orifices 64 are formed through the peripheral wall of the hollow cylindrical piston rod 26. The orifices respectively extent radially in transverse to the axis of the piston rod 26 and have inner ends opening adjacent the upper end of the lower larger diameter section 62 of the through opening and outer ends opening toward the upper pressure chamber 22. On the other hand, the lower end of the through opening 28 opens toward the lower pressure chamber 24. Therefore, the upper and lower chambers 22 and 24 are also communicated through the orifices 64 and the larger diameter section 62.

A rotary valve 66 is disposed in the larger diameter section 62. The rotary valve 66 has a peripheral wall opposing to the inner ends of the orifices 64. A plurality of communication openings 68 (only two are shown) are formed through the peripheral wall of the rotary valve member 66. The plurality of orifices 68 respectively extend in transverse direction to the axis of the piston rod and have outer end opposing the orifices 64. The orifices 68 are separated into several groups and have different diameter to that in other groups. The rotary valve member 66 is rotatable to change its angular position to one group of orifices 68 to the orifices 64 for establishing fluid communication between the upper and lower .pressure chambers 22 and 24 therethrough. Therefore, depending upon the angular position of the rotary valve member 66, the group of the orifices 68 to be aligned with the orifice 64 is varied to vary the path area for fluid flow between the upper and lower pressure chambers 22 and 24. Since flow restriction of the combined orifices 64 and 68 is variable depending upon the angular position of the rotary valve member 66. Therefore, damping force to be created by the shock absorber is variable depending upon the angular position of the rotary valve member 66.

The rotary valve member 66 is formed integrally with an actuation rod 70. The actuation rod 70 extends through the smaller diameter section 60 of the through opening 28 and is connected to the rotary actuator 100 so that it may be driven with the rotary valve member 66 for varying the angular position and whereby varying the damping characteristics.

In the shown embodiment, the rotary actuator 70 is mounted on the top of the piston rod 26 and supported by an actuator bracket 72. The actuator bracket 72 is of generally deep dish-shaped configuration and mounted on the collar 36 of the upper mount insulator assembly 32. The actuator bracket 72 is secured onto the upper mount insulator assembly 32 by the fastening nut 38. A flange 74 laterally extends from the upper edge of the actuator mount 72. On the other hand, the rotary actuator 70 has a housing 102 having a laterally extending flange 104. The flange 104 of the rotary actuator housing 102 mates with the flange 74 of the actuator mount 72 and rigidly secured by means of fastening bolts 76.

In practice, the rotary actuator 70 is operable by a damper control signal which is indicative of the desired damping characteristics of the shock absorber. The damper control signal is produced by manual selection of a manual switch (not shown). On the other hand, the control signal may be produced based on the vehicle driving condition as detected various sensors, in an automatic suspension control. One example of the automatic suspension control system has been disclosed in the aforementioned U.S. Pat. No. 4,600,215. On the other hand, the structure of the shock absorber with a rotary valve member which is operable by manual operation of the manually operable switch, has been disclosed in the U.S. Pat. No. 4,526,401, issued on July 2, 1985. The disclosure of the above-identified U.S. Pats. are herein incorporated by reference for the sake of disclosure.

Figure 2:
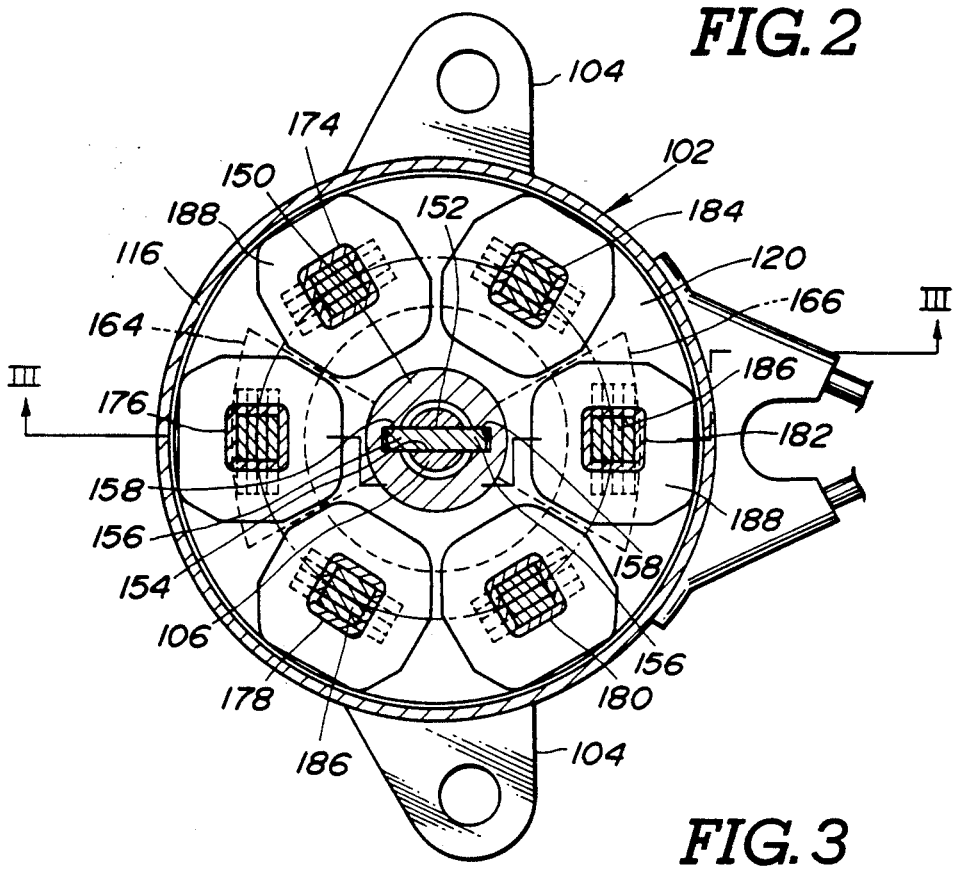
FIG. 2 is a transverse section of the rotary actuator in FIG. 1, as taken along line II—II of FIG. 1.
Figure 3:
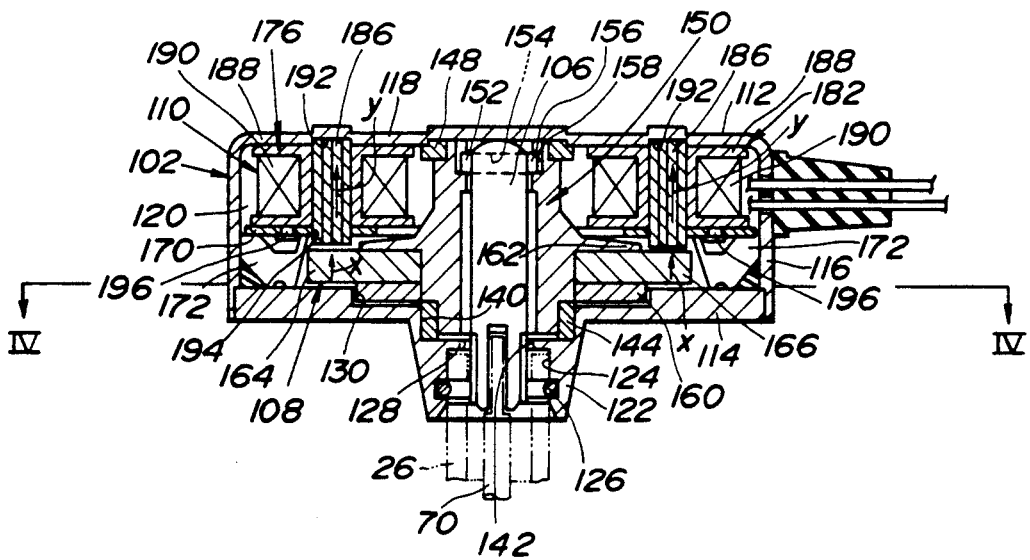
FIG. 3 is a section of the rotary actuator taken along line III—III of FIG. 2.
Figure 4:
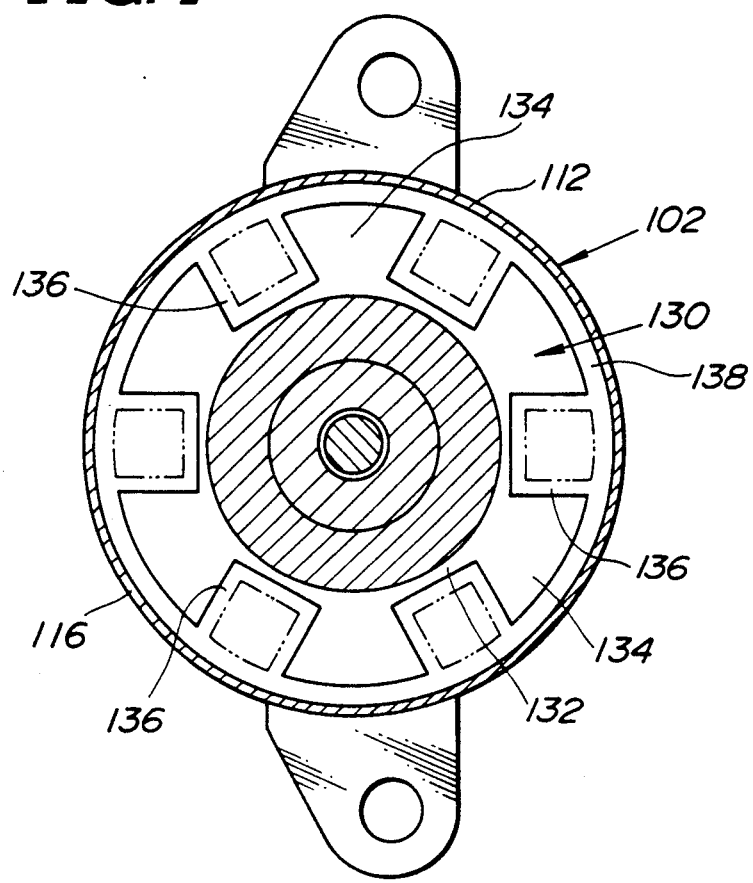
FIG. 4 is a section take along line IV—IV of FIG. 3.

FIGS. 2 to 4 show the detailed construction of the preferred embodiment of the rotary actuator 100 according to the invention. The rotary actuator 100 comprises aforementioned housing 102, an output shaft 106, a rotor 108 and a stator 110. As clearly shown in FIG. 3, the housing 102 includes an upper cover member 112 and an essentially disc-shaped base plate 114. The upper cover member 112 is of generally reversed bowl-shaped configuration having axially extending circumferential wall section 116 and laterally extending upper wall section 118 adjoining at the circumferential edge to the circumferential wall section. The lower edge of the circumferential section 116 of the upper cover member 112 engages with the circumferential edge of the base plate 114 in order to define an enclosed space 120 therebetween. The output shaft 106, the rotor 108 and the stator 110 are housed within the enclosed space 120. The flanges 104 are integrally formed with the base plate 114.

The base plate 114 has a center section 122 extending downwardly from the general lower surface of the base plate 114 to form a boss section for the output shaft 106. An axially extending through opening 124 is formed through the boss section 122. The through opening 124 has an internal diameter substantially corresponding corresponds to the outer diameter of the piston rod 26. Therefore, the top end of the piston rod 26 is received within the aforementioned opening 124. An elastic seal ring 126 is disposed between the inner periphery of the through opening 124 of the boss section 122 and the outer periphery of the piston rod 26 for establishing seal therebetween. Annular projection 128 inwardly extends from the inner periphery of the through opening 124 so that the lower surface thereof mates with the top edge of the piston rod 26. The top end of the actuation rod 70 extends from the top end of the piston rod 26 so that it engages with bifurcated lower end of the output shaft 106. The top end of the actuation rod 70 and the lower end of the output shaft 106 are keyed in an appropriate manner so that the actuator rod may rotate according to rotation of the output shaft 106.

On the other hand, the base plate 114 is formed with a recess 130 on the upper surface thereof. The recess 130 is composed of a central annular section 32 and a radially extending sections 134' which are arranged with a regular intervals to define radially extending essentially rectangular projections 136. The projections 136 extends from an annular projection 138 extending along circumferential edge portion of the base plate 114. The recess 130 adjoins to a stepped down bearing section 140 formed at the center of the base plate 114. The bearing section 140 is communicated with the through opening 124 of the boss section 122 via a communication path 142 defined by the annular projection 128. The bearing section 140 receives a bearing bushing 144.

An impression which serves as a boss 146 for receiving the top end of the output shaft 106, is formed on the upper wall section 118 of the cover 112. The boss 146 is oriented in axially alignment with the bearing section 140. The boss 146 receives therein an annular bearing bushing 148. Between the bearing bushings 144 and 148, a cylindrical rotor support shaft 150 is arranged coaxially to the output shaft 106. The rotor support shaft 150 is keyed to the output shaft 106 by means of a key 152 which extends through key opening 154 defined transversely through the output shaft 106 and has both end portions 156 engaging with key slots 158. Therefore, the rotor support shaft 150 is cooperated with the output shaft 106 for rotation therewith.

An annular disc-shaped stay plate 160 rigidly attached on the outer periphery of the rotor support shaft 150. The stay plate 160 has an outer diameter substantially corresponding to or slightly smaller than radial position of the inner peripheral edge of the projection 132 and thus is received within the annular section 132 of the recess 130 of the base plate 114. Opposing to the stay plate 160, an annular disc-shaped retainer plate 162 radially extends from the outer periphery of the rotor support shaft 150 in spaced apart relationship to the stay plate. A pair of generally fan-shaped permanent magnets 164 and 166 are received in the space defined between the stay plate 160 and the retained plate 162. The permanent mangets 164 and 166 are arranged in radially symmetrical positions.

It should be appreciated that, through the shown embodiment employs a pair of magnet for constituting the rotor assembly together with the rotor support shaft, it would be possible to employ three or more permanent magnets, if desired. Therefore, the number of permanent magnets constituting the rotor assemble is to be appreciated as not essential feature of the present invention.

As will be appreciated, the pair of permanent magnets 164 and 166 are rigidly engaged with the space between the stay plate 160 and the retainer plate 162 for rotation with the rotor support shaft 150 with maintaining the symmetric positional relationship with the each. As clearly seen from FIG. 3, the outer periphery of the permanent magnets 164 and 166 are oriented outside of the outer peripheral edge of the stay plate 160 and the retainer plate 162. The lower surface of the permanent magnetic 164 and 166 are positioned above the upper surface of the projections 134 of the base plate 114 with maintaining a small clearance therebetween. There two permanent magnets 164 and 166 are magnetized to have upwardly directed magnetic fields as shown by arrows X in FIG. 3.

The permanent magnets 164 and 166 and the rotor support shaft 150 assembled as set forth above, constitute the rotor assembly 108.

On the other hand, the stator assembly 110 comprises an annular mount base 170 which is rigidly secured on the inner periphery of the base plate. The mount base 170 is vertically positioned slightly above the upper surface of the retainer plate 162 with leaving a small clearance therebetween. On the mount base 170, a plurality of electromagnets 174, 176, 178, 180, 182 and 184 are arranged with a regular intervals. Though the shown embodiment employs six electromagnets 174, 176, 178, 180, 182 and 184 for forming the stator assembly 110, the number of the electromagnet should be appreciated as non-essential matter to the invention. Each of the electromagnets 174, 176, 178, 180, 182 and 184 comprises a magnetic core 186, a coil bobbin 188 and an electromagnetic coil 190. As seen from FIG. 3, the magnetic cores 186 of respective electromagnets 174, 176, 178, 180, 182 and 184 are received between recesses 192 formed on the inner periphery of the upper wall section 118 of the upper cover member 112 and through openings 194 formed through the mount base 170. On the other hand, the coil bobbins 188 of respective electromagnets 174, 176, 178, 180, 182 and 184 are rigidly secured on the mount base 170 by means of rivets 196. These electromagnets 174, 176, 178, 180, 182 and 184 are arranged to have center axes respectively coincides with the center axes of the magnetic field, as shown by arrow y.

Radially symmetrically arranged pairs of the electromagnetic 174 and 180, 176 and 182, and 178 and 184 form groups. These groups of the electromagnets 176 and 180, 176 and 182, and 178 and 184 are designed to be energized and deenergized as pairs.

Therefore, in the shown embodiment, the three pair of electromagnets 174 and 180, 176 and 182, and 178 and 184 are cooperated with the pair of permanent magnets 164 and 166 for driving the rotary valve member 66 at three angular positions via the output rod 106 and the actuator rod 70 by angular displacement of the rotor assembly 108. Therefore, in the shown embodiment, the damping characteristics of the shock absorber is variable between SOFT mode in which the smallest damping force is to be produced, HARD mode in which the greatest damping force is to be produced and a MEDIUM mode in which the damping force to be produced is intermediate between those produced in the SOFT mode in which the damping force to be produced is intermediate between those produced in the SOFT mode and the HARD mode. In the shown arrangement, it is assumed that the rotary valve member 66 is positioned at SOFT mode position when the electromagnets 174 and 180 are energized, at a MEDIUM mode position when the electromagnets 176 and 182 are energized, and at a HARD mode position when the electromagnets 178 and 180 are energized.

Figure 5:
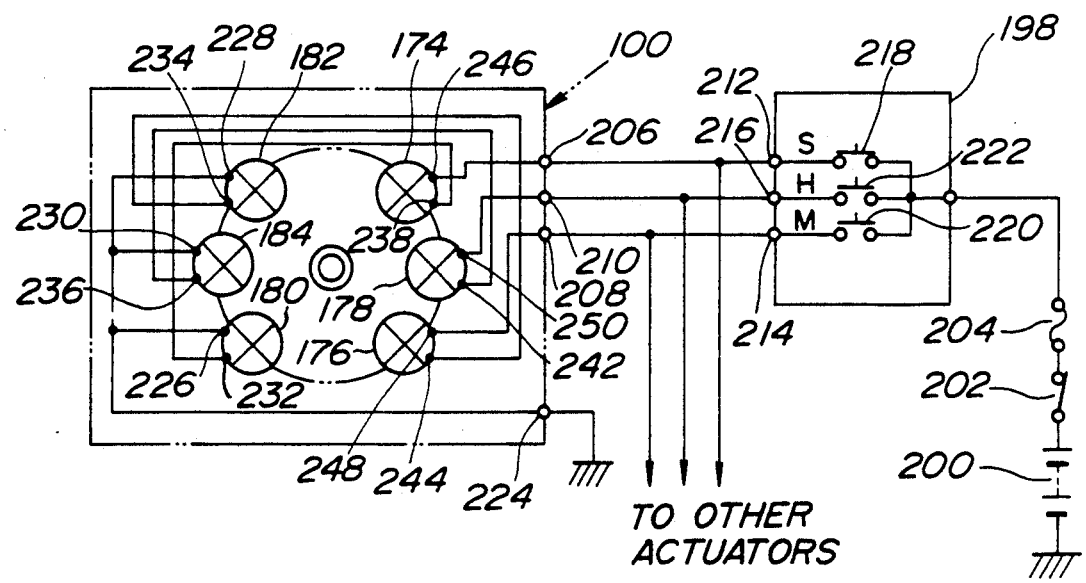
FIG. 5 is a circuit diagram of the first embodiment of a driver circuit for the rotary actuator.

FIG. 5 shows a circuit diagram of the first embodiment of a driver circuit for selectively energizing the electromagnets 174, 176, 178, 180, 182 and 184 for controlling the position of the rotary valve 66. In order to selectively energizing the electromagnets 174, 176, 178, 180, 182 and 184, a manually operable mode selector switch 198 is provided in the driver circuit. In the shown embodiment, the mode selector switch 198 is operable between a SOFT mode position, a MEDIUM mode position and a HARD mode position. The mode selector switch 198 is disposed between a vehicular a power source and the actuator which composed of the electromagnets 174, 176, 178, 180, 182 and 184. The power source includes a vehicular battery 200, a main witch 202, such as an ignition switch, and a fuse 204.

The actuator 100 has three input terminals 206, 208 and 210. The terminal 206 is connected to a SOFT mode terminal 212 to be connected to the power source via a SOFT mode contactor 218. The terminal 208 is connected to a MEDIUM mode terminal 214 which is, in turn, connected to the power source via a MEDIUM mode contactor 220. The terminal 210 is connected to a HARD mode terminal 216 of the mode selector switch, which HARD mode terminal is connected to the power source via a HARD mode conductor 222. The actuator 100 also has a grounding terminal 224 which is commonly connected to rounding terminals 226, 228 and 230 of the electromagnets 180, 182 and 184. Input terminals 232, 234 and 236 are respectively connected to output terminals 238, 240 and 242 of the electromagnets 174, 176 and 178. On the other hand, the input terminals 246, 248 and 250 are connected to the terminals 206, 208 and 210. As will be appreciated from this, the pairs of the electromagnets 174 and 180, 176 and 182 and 178 and 184 are connected in series with respect to the terminals 206, 208 and 210.

In the shown construction, when the mode selector switch 198 is operated to select the SOFT mode position, the SOFT mode contactor 218 is shifted to the conductive position to establish electric connection between the power source and the SOFT mode terminal 212 to supply the electric power to the electromagnets 174 and 180. Therefore, the electromagnets 174 and 180 are energized to generate magnetic fields in the direction y for drawing the permanent magnets 164 and 166. By this magnetical drawing force, the rotor assembly 108 is rotated to the angular position to place the permanent magnets in vertical alignment with the electromagnets 174 and 180. This rotor position corresponds to the SOFT mode position of the rotary valve member 66. At the SOFT mode position, one group of the orifices 68 having the largest path area are aligned with the orifices 64 of the piston rod 26. Therefore, flow resistance for the working fluid passing through the orifices 64 and the larger diameter section 62 of the through opening 28 becomes the smallest. As a result, the damping force to be created in response to bounding and rebounding motion of the piston, become the smallest.

Figure 6:
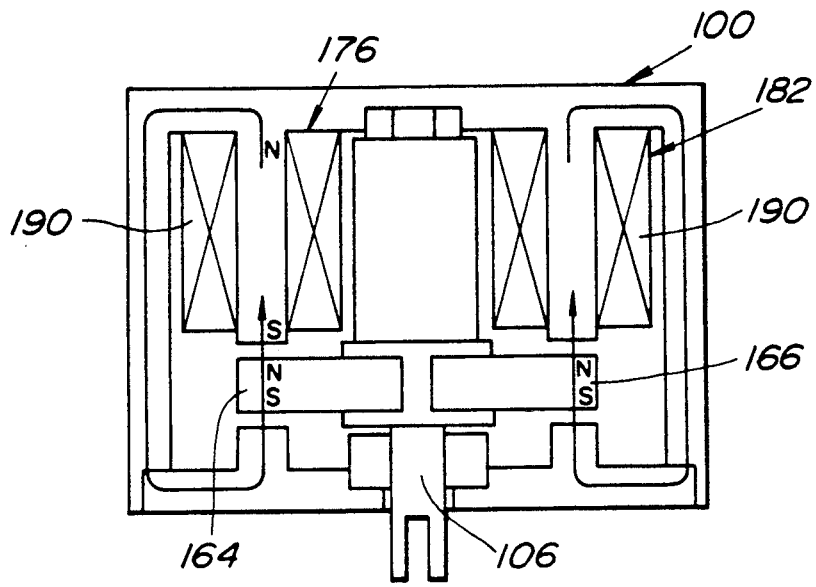
FIG. 6 is a fragmentary illustration of the second embodiment of a rotary actuator.

Namely, by establishing the magnetic field in the electromagnets 174 and 180 in the y direction in FIG. 6, the south pole (S pole) is formed at the side adjacent the permanent magnets 164 and 166. On the other hand, the permanent magnets 164 and 166 have north poles (N poles) at the side adjacent the stator 110. Therefore, the N poles of the permanent magnets 164 and 166 are drawn to the S poles of the electromagnets 174 and 180 as energized.

When the mode selector switch 198 is operated to select the MEDIUM mode position, the MEDIUM mode contactor 220 is shifted to the conductive position to establish electric connection between the power source and the MEDIUM mode terminal 214 to supply the electric power to the electromagnets 176 and 182. Therefore, the electromagnets 176 and 182 are energized to generate magnetic fields in the direction y for drawing the permanent magnets 164 and 166. By this magnetical drawing force, the rotor assembly 108 is rotated to the angular position to place the permanent magnets in vertical alignment with the electromagnets 176 and 182. This rotor position corresponds to the MEDIUM mode position of the rotary valve member 66. At the MEDIUM mode position, one group of the orifices 68 having the intermediate path area are aligned with the orifices 64 of the piston rod 26. Therefore, flow resistance for the working fluid passing through the orifices 64 and the larger diameter section 62 of the through opening 28 becomes the intermediate between that in the HARD mode and SOFT mode. As a result, the damping force to be created in response to bounding and rebounding motion of the piston becomes intermediate.

When the mode selector switch 198 is operated to select the HARD mode position, the HARD mode contactor 222 is shifted to the conductive position to establish electric connection between the power source and the HARD mode terminal 216 to supply the electric power to the electromagnets 178 and 184. Therefore, the electromagnets 178 and 184 are energized to generate magnetic fields in the direction y for drawing the permanent magnets 164 and 166. By this magnetical drawing force, the rotor assembly 108 is rotated to the angular position to place the permanent magnets in vertical alignment with the electromagnets 178 and 184. This rotor position corresponds to the HARD mode position of the rotary valve member 66. At the HARD mode position, one group of the orifices 68 having the smallest path area aligned with the orifices 64 of the piston rod 26. Therefore, flow resistance for the working fluid passing through the orifices 64 and the larger diameter section 62 of the through opening 28 becomes the greatest. As a result, the damping force to be created in response to bounding and rebounding motion of the piston, become the greatest.

As will be appreciated herefrom, by the arrangement of the shown embodiment, the electromagnets and the permanent magnets are arranged in vertically spaced relationship. This arrangement clearly reduces planar area to be occupied by the actuator 100.

Figure 7:
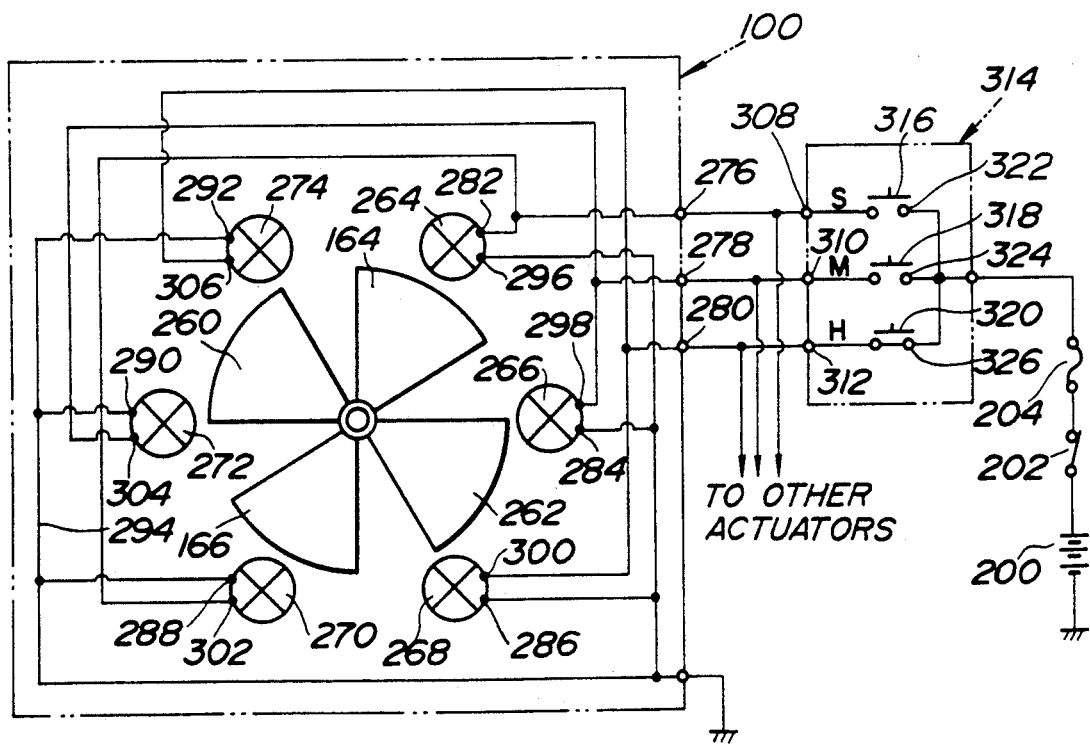
FIG. 7 is a circuit diagram of the second embodiment of a driver circuit for the rotary actuator.
Figure 8:
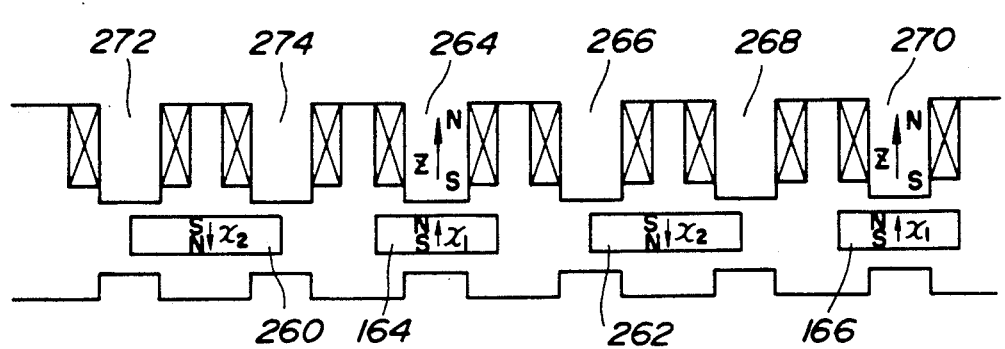
FIG. 8 is an explanatory illustration showing magnetical relationship between permanent magnets and electromagnets to be employed in the second embodiment of the rotary actuator illustrated in FIG. 6.

FIGS. 7 and 8 shows another embodiment of the actuator for the variable damping force shock absorber. FIG. 7 shows a circuit diagram showing the second embodiment of the actuator 100 to drive the rotary valve member 66 via the output rod 106 and the actuation rod 70. In this embodiment, the rotor assembly 108 is composed of the rotor support shaft 150, a pair of primary permanent magnets 164 and 166, and a pair of auxiliary permanent magnets 260 and 262. The auxiliary permanent magnets 260 and 262 are magnetized to form the magnetic fields in a direction opposite to the direction of the magnetic fields formed by the primary permanent magnets 164 and 166. Namely, in the shown embodiment, the primary permanent magnets 164 and 166 are magnetized to have N poles at the side adjacent the stator 110 to form the upwardly directed ($x_1$ direction) magnetic fields, as shown in FIG. 8. On the other hand, the auxiliary permanent magnets 260 and 262 are magnetized to have N poles at the side remote from the stator to form downwardly directed ($x_2$ direction) magnetic fields.

The primary and auxiliary permanent magnets 164, 166, 260 and 262 are arranged with a regular interval and in radially synmetrical arrangement. Namely, the primary permanent magnets 164 and 166 are arranged radially synmetrical arrangement by aligning the center axes thereof. On the other hand, the auxiliary permanent magnets 260 and 262 are arranged in radially synmetric arrangement by aligning the center axes thereof, which center axes of the auxiliary permanent magnets lie perpendicular to the center axes of the primary permanent magnets 164 and 166.

In this embodiment, six electromagnets 264, 266, 268, 270 and 272 are regularly arranged on the stator 110. Similarly, the electromagnets 264, 266, 268, 270, 272 and 274 are separated into three pairs 264 and 270, 266 and 272, and 268 and 274 respectively corresponds to the angular positions of the rotor assembly 108 corresponding to SOFT, MEDIUM, HARD positions of the rotary valve member 66. Respective pairs of electromagnets 264 and 270, 266 and 272, and 268 and 274 are connected to input terminals 276, 278 and 280. On the other hand, the pairs of electromagnets 264 and 270, 266 and 272, and 268 and 274 are commonly connected to the conductive member of the vehicle body for grounding That is, the electromagnets 264, 266 and 268 have one terminals 282, 284, 286 respectively connected to the input terminals 276, 278 and 280. On the other hand, one terminals 288, 290 and 292 of the electromagnets 270, 272 and 274 are connected to the ground via a common grounding line 294. The other terminals 286, 298 and 300 of the electromagnets 264, 266 and 268 are connected to the other terminals 302, 304 and 306 of the electromagnets 270, 272 and 274.

The input terminals 276, 278 and 280 of the actuators are connected to output terminals 308, 310 and 312 of a mode selector switch assembly 314 which includes a SOFT mode contactor 316, a MEDIUM mode contactor 318 and a HARD mode contactor 320. These contactors 316, 318 and 320 are formed as normally open contacts normally biased away from power terminals 322, 324 and 326 respectively corresponding the SOFT mode, MEDIUM mode and HARD mode contactors 316, 318 and 320. There power terminals 322, 324 and 326 are connected to the power source including the vehicular battery 200, the main switch 202 and the fuse 204.

With the foregoing construction, when mode selector switch assembly 314 is manually operated to select one of the SOFT, MEDIUM and HARD modes, the corresponding one of pairs of electromagnets 264 and 270, 266 and 272 or 268 and 274 are energized to generate magnetic fields in upward direction y. Namely, the electromagnets 264 and 270, 266 and 272 or 268 and 274 as energized form N pole at the side remote from the rotor and S pole at the side adjacent the rotor. Therefore, the primary permanent magnets 164 and 166 having N pole adjacent the electromagnets are drawn to be vertically aligned with the energized electromagnets 264 and 270, 266 and 272 or 268 and 274. On the other hand, the auxiliary permanent magnets 260 and 262 having S pole adjacent the stator repulse against the magnetic fields formed around the energized electromagnets 264 and 270, 266 and 272 or 268 and 274. This repulsion force generated between the auxiliary permanent magnets 260 and 262 and the energized electromagnets serves for driving the rotor 108 at the position corresponding to the designed one of the SOFT, MEDIUM and HARD modes.

Figure 9:
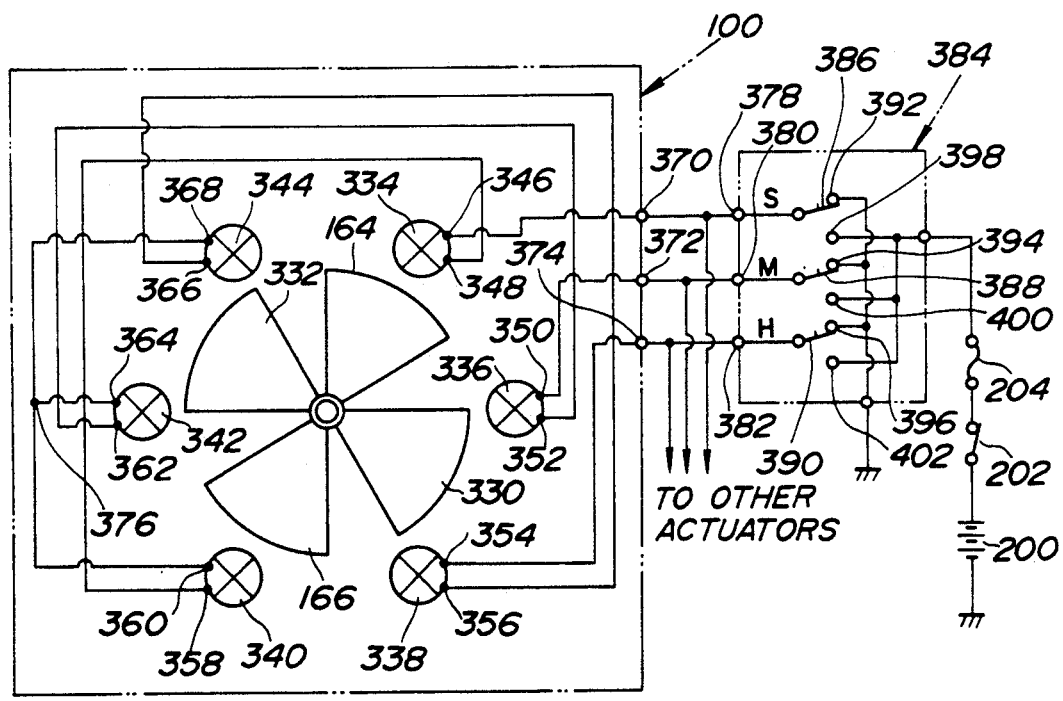
FIG. 9 is a circuit diagram of the third embodiment of a driver circuit for the rotary actuator.

FIGS. 9 and 10 show the third embodiment of the rotary actuator according to the invention. FIG. 9 shows a circuit diagram showing the third embodiment of the actuator 100 to drive the rotary valve member 66 via the output rod 106 and the actuation rod 70. In this embodiment, the rotor assembly 108 is composed of the rotor support shaft 150, a pair of primary permanent magnets 164 and 166, and a pair of auxiliary permanent magnets 330 and 332. The auxiliary permanent magnets 330 and 332 are magnetized to form the magnetic fields in a direction opposite to the direction of the magnetic fields formed by the primary permanent magnets 164 and 166. Namely, in the shown embodiment, the primary permanent magnets 164 and 166 are magnetized to have N poles at the side adjacent the stator 110 to form the upwardly directed ($x_1$ direction) magnetic fields, as shown in FIG. 10. On the other hand, the auxiliary permanent magnets 330 and 332 are magnetized to have N poles at the side remote from the stator to form downwardly directed ($x_2$ direction) magnetic fields.

The primary and auxiliary permanent magnets 164, 166, 330 and 332 are arranged with a regular interval and in radially synmetrical arrangement. Namely, the primary permanent magnets 164 and 166 are arranged radially synmetrical arrangement by aligning the center axes thereof. On the other hand, the auxiliary permanent magnets 330 and 332 are arranged in radially synmetric arrangement by aligning the center axes thereof, which center axes of the auxiliary permanent magnets lie perpendicular to the center axes of the primary permanent magnets 164 and 166.

In this embodiment, six electromagnets 334, 336, 338, 340, 342 and 344 are regularly arranged on the stator 110. Similarly to the foregoing embodiments, the electromagnets 334, 336, 338, 340, 342 and 344 are separated into three pairs 334 and 340, 336 and 342, and 338 and 344 respectively corresponds to the angular positions of the rotor assembly 108 corresponding to SOFT, MEDIUM, HARD positions of the rotary valve member 66.

The electromagnets 334, 336, 338, 340, 342 and 344 respectively have two terminals 346, 348; 350, 352; 354, 356; 358, 360; 362, 364; and 364 and 366. The terminals 346 of the electromagnet 334, the terminal 350 of the electromagnet 336 and the terminal 354 of the electromagnet 338 are respectively connected to input terminals 370, 372 and 374. On the other hand, terminal 348 of the electromagnet 334 is connected to the terminal 358 of the electromagnet 340. The terminal 352 of the electromagnet 336 is connected to the terminal 362 of the electromagnet 342. The terminal 356 of the electromagnet 336 is connected to the terminal 366 of the electromagnet 344. On the other hand, the terminals 360, 364 and 368 are commonly connected to a junction 376.

Therefore, as explanatory illustrated in FIG. 11, the three pairs of electromagnets 334 and 340, 336 and 342, and 338 and 344 are connected at the junction 376 in common.

The input terminals 370, 372 and 374 of the actuators are connected to output terminals 378, 380 and 382 of a mode selector switch assembly 384 which includes a SOFT mode contactor 386, a MEDIUM mode contactor 388 and a HARD mode contactor 390. These contactors 386, 388 and 390 are normally biased toward grounding terminals 392, 394 and 396 so that the output terminals 378, 380 and 382 of the mode selector switch assembly 384 is normally connected to the ground. On the other hand, the mode selector switch assembly 384 has power terminals 398, 400 and 402 respectively corresponding the SOFT mode, MEDIUM mode and HARD mode contactors 386, 388 and 380. There power terminals 398, 400 and 402 are connected to the power source including the vehicular battery 200, the main switch 202 and the fuse 204.

With the foregoing construction, when mode selector switch assembly 314 is manually operated to select one of the SOFT, MEDIUM and HARD modes, the corresponding one of pairs of electromagnets 334 and 340, 336 and 342 or 338 and 344 are energized to generate magnetic fields in upward direction y. Namely, the electromagnets 334 and 340, 336 and 342 or 338 and 344 as energized form N pole at the side remote from the rotor assembly and S pole at the side adjacent the rotor assembly and whereby generate magnetic field in the upward direction $z_1$. On the other hand, remaining two pairs of electromagnets are also energized in the shown embodiment to form N pole adjacent the rotor assembly and S pole at the side remote from the rotor assembly to generate the magnetic field in downward direction $z_2$, as shown in FIG. 10. Therefore, the primary permanent magnets 164 and 166 having N pole adjacent the electromagnets are drawn to be vertically aligned with the electromagnets 334 and 340, 336 and 342 or 338 and 344 having the S pole adjacent the rotor assembly. On the other hand, the auxiliary permanent magnets 330 and 332 having S pole adjacent the stator repulse against the magnetic fields formed around the S pole of the electromagnets 334 and 340, 336 and 342 or 338 and 344 formed adjacent to the stator assembly and drawn by the N pole formed in the other two pairs of electromagnets. These repulsion force and drawing force of the electromagnets having N pole adjacent the stator assembly serve for driving the rotor 108 at the position corresponding to the designed one of the SOFT, MEDIUM and HARD modes.

Since the aforementioned third embodiment is directed to three-way damping force adjustable shock absorber, the coils of the electromagnets are connected as shown in FIG. 11, it would be modify the connection of the electromagnets according to the variation steps of the damping forces. For instance, FIG. 12 shows electromagnet connection for two-way adjustable damping force shock absorber, in which electromagnets A and B are respectivelt connected to the input terminals a and b and commonly connected to the ground via a junction J, and FIG. 13 shows electromagnet connection for four-way adjustable damping force shock absorber, in which electromagnets A, B C and D are respectivelt connected to the input terminals a, b, c and d and commonly connected to the ground via a junction J.

Figure 14:
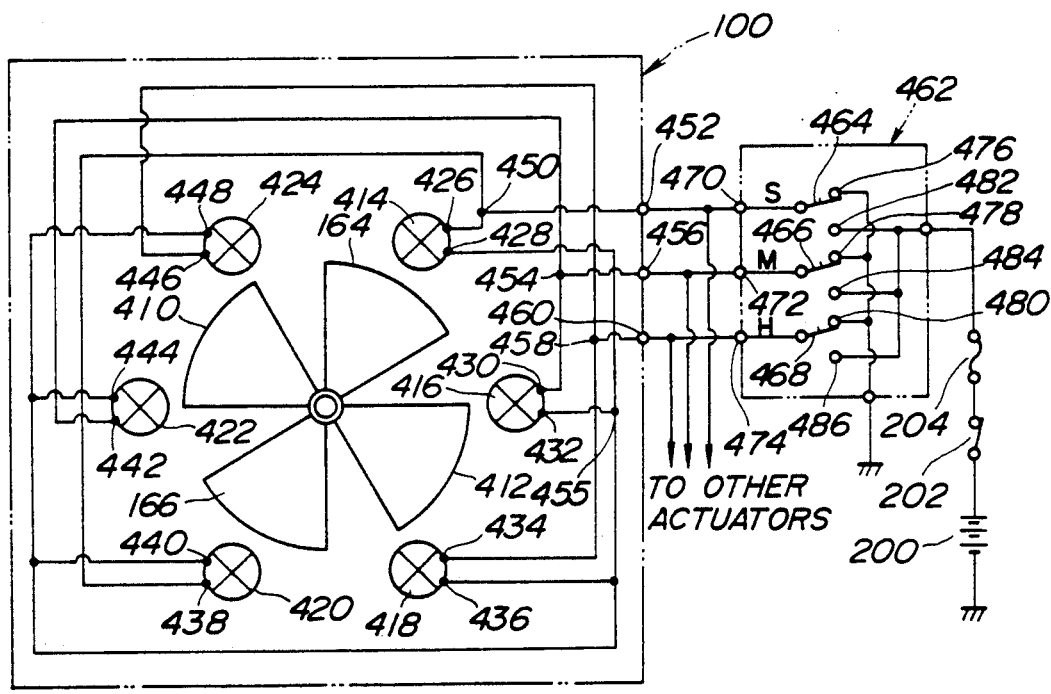
FIG. 14 is a circuit diagram of the fourth embodiment of a driver circuit for the rotary actuator.

FIG. 14 shows the fourth embodiment of the actuator circuit of the rotary actuator of the present invention. Similarly to the foregoing embodiments, the rotor assembly is provided with primary permanent magnets 164 and 166 and auxiliary permanent magnets 410 and 412. Three pairs of electromagnets 414 and 420, 416 and 422, and 418 and 424 are provided in the stator assembly. The electromagnets 414, 416, 418, 420, 422 and 424 have terminals 426, 428; 430, 432; 434, 436; 438, 440; 442, 444; and 446, 448. The terminals 426 and 438 of the electromagnets 414 and 420 are connected to an input terminal 452 via a junction 450. Similarly the terminals 430 and 442 of the electromagnets 416 and 422 are connected to an input terminal 456 via a junction 454. Furthermore, the terminals 434 and 446 of the electromagnets 418 and 424 are connected to an input terminal 460 via a junction 458. On the other hand, the terminals 428, 432, 436, 440, 444 and 448 of the electromagnets 414, 416, 418, 420, 422 and 424 are connected to a common line 455.

The input terminals 452, 456 and 460 of the actuators are connected to output terminals 470, 472 and 474 of a mode selector switch assembly 462 which includes a SOFT mode contactor 464, a MEDIUM mode contactor 466 and a HARD mode contactor 468. These contactors 464, 466 and 468 are normally biased toward grounding terminals 476, 478 and 480 so that the output terminals 470, 472 and 474 of the mode selector switch assembly 462 is normally connected to the ground. On the other hand, the mode selector switch assembly 384 has power terminals 482, 484 and 486 respectively corresponding the SOFT mode, MEDIUM mode and HARD mode contactors 464, 466 and 468. There power terminals 482, 484 and 486 are connected to the power source including the vehicular battery 200, the main switch 202 and the fuse 204.

With the circuit construction set forth above, substantially the same electromagnets' operation to that of the foregoing thrid embodiment can be obtained.

In addition, though the shown embodiments have been directed to the shock absorbers whose damping modes are manually selected through manually operable mode selector switch assemblies, it would be possible to select the damping mode automatically depending upon the vehicle driving condition, such as road roughness, vehicular rolling magnitude, vehicular pitching magnitude and so forth.

As will be sppreciated herefrom, the present invention fulfills all of the objects and advantages sought therefore.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A rotary actuator for rotatingly driving a rotatable member for controlling a shock absorber in a vehicle, comprising:

a rod member connected to a rotatable member for rotation therewith;

a rotor assembly including a permanent magnet having a first pole at first side and a second pole at second side thereof, said permanent magnet being associated with said rod member for rotatingly drive the latter according to angular displacement thereof;

a stator assembly provided essentially in alignment with said rotor assembly along the axis of said rod member and opposing to said first side of said permanent magnet, said stator assembly including a plurality of pairs of electromagnets which are arranged in axially spaced apart relationship with said permanent magnet with a predetermined clearance in a direction of the axis of said rod member, and each electromagnet of said plurality of pairs being placed symmetrically opposite each other in relation to the axis, each of said electromagnets being adapted to be energized to have a second pole at the side adjacent said permanent magnet and a first pole at the side remote from said permanent magnet; and switch means for selectively energizing one pair of said electromagnets for rotatingly driving said permanent magnet with said rotatable member via said rod member in a stepwise manner sequentially to a plurality of predetermined positions.

2. A rotary actuator as set forth in claim 1, wherein said rotor assembly includes a plurality of permanent magnets respectively having first poles at said first sides and second poles at said second sides, and said electromagnets of said stator assembly forms groups, said electromagnets in each group being oriented at angular positions to be placed in alignment with the corresponding one of permanent magnets when one of the electromagnets in the same group is axially aligned with one of said permanent magnets.

3. A rotary actuator as set forth in claim 2, wherein said groups of electromagnets are respectively arranged at predetermined angular positions corresponding to the desired angular positions of said rotatable member.

4. A rotary actuator as set forth in claim 1, wherein said rotor assembly further comprises an auxiliary permanent magnet having said second pole at its first side and said first pole at its second side, said auxiliary permanent magnet being arranged at the angular position circumferentially shifted from said permanent magnet having first pole at said first side and second pole at said second side for creating rotational torque for driving said rotatable member via said rod member by repulsion between the second pole of said first side thereof and said second pole of the energized electromagnet.

5. A rotary actuator as set forth in claim 1, wherein said electromagnets are designed to be controlled electric current flow direction by said switch means in such a manner that when one of said electromagnets is energized to form said second pole at the side adjacent said rotor assembly and first pole at the side remote from said rotor assembly, the other electromagnet located adjacent said one of electromagnets is energized to have first pole at the side adjacent said rotor assembly and second pole at the side remote from said rotor assembly.

6. A rotary actuator as set forth in claim 5, wherein each of said electromagnets are connected to an electric power source via said switch means at one terminal and are commonly connected to the ground at the other terminal.

7. A rotary actuator for rotatably driving a rotary member for controlling a shock absorber in a vehicle, comprising:

a rotor assembly including a permanent magnet having a first pole at a first side and a second pole opposite to said first pole at a second side opposite to said first side;

a stator assembly provided essentially in axial alignment with said rotor assembly and opposing to said first side of said permanent magnet, said stator assembly mounting a plurality of pairs of electromagnets which are arranged in axially spaced apart relationship with said permanent magnet with a predetermined clearance in the axial direction, and each electromagnet of said plurality of pairs being placed symmetrically opposite each other in relation to the axis of said rotor assembly, each of said electromagnets being connected to a direct current to be energized for forming a magnetic field across said permanent magnet for generating circumferentially directed torque; and switching means for selectively energizing one pair of said electromagnets for rotatingly driving said rotor assembly with said permanent magnet for driving said rotary member in a stepwise manner sequentially to a plurality of predetermined positions.

8. A rotary actuator for rotatingly driving a rotary member for controlling a shock absorber in a vehicle, comprising:

a rotor assembly carrying a first permanent magnet having a first pole at a first side and a second pole opposite to said first pole at a second side opposite to said first side, and a second permanent magnet having a second pole at said first side and a first pole at said second side;

a stator assembly provided essentially in axial alignment with said rotor assembly and opposing to said first side of said permanent magnets, said stator assembly mounting a plurality of electromagnets which are arranged in axially spaced apart relationship with said permanent magnets with a predetermined clearance in an axial direction, said electromagnets comprising a first electromagnet connected to a direct current source so as to be energized for forming a polarity matching said first pole at an end proximate said first side of said permanent magnets and a second electromagnet connected to said direct current source so as to be energized to from a polarity matching said second pole at an end proximate with said first side of said permanent magnets, each of said electromagnets being connected to said direct current source to receive therefrom a direct current to be selectively energized for forming a magnetic field across said permanent magnets for generating circumferentially directed torque; and switching means for selectively energizing one of said first and second electromagnets for generating magnetic driving torque for rotatingly driving said rotary member via said rotor assembly in a stepwise manner sequentially to a plurality of predetermined positions.

9. A rotary actuator for rotatably controlling a variable damping force shock absorber for a vehicle, comprising:

a rotor assembly including a permanent magnet having a first pole at a first side and a second pole opposite to said first pole at a second side opposite to said first side;

a stator assembly provided essentially in axial alignment with said rotor assembly and opposing said first side of said permanent magnet, said stator assembly mounting a plurality of pairs of electromagnets which are arranged in axially spaced apart relationship with said permanent magnet with a predetermined clearance in an axial direction, and each electromagnet of each pair of said plurality of pairs being placed symmetrically in opposite each other respectively in relation to said stator's rotational axis, each of said electromagnets being connected to a direct current source to receive therefrom a direct current to be energized for forming a magnetic field across said permanent magnet for generating circumferentially directed torque;

switching means for selectively energizing one pair of said electromagnets for rotatingly driving said rotor assembly with said permanent magnet for driving said shock absorber in a stepwise manner sequentially to a plurality of predetermined positions; and said shock absorber being rotatably positionable in one of first, second, or third positions.

10. A rotary actuator for rotatably controlling a variable damping force shock absorber for a vehicle, comprising:

a rotor actuator for rotatably controlling a variable having a first pole at a first side and a second pole at a second side, said first side situated opposite said second side, a second pair of permanent magnets having first and second sides corresponding to said sides of said first pair of permanent magnets and of magnetic polarity opposite thereto;

a stator assembly provided essentially in axial alignment with said rotor assembly and opposing said first side of said permanent magnet, said stator assembly mounting a plurality of pairs of electromagnets which are arranged in axially spaced apart relationship with said permanent magnets with a predetermined clearance in an axial direction, said electromagnet pairs including a first pair connected to a direct current source so as to be energized for forming a polarity matching said first pole at ends proximate said first side of said permanent magnets and a second pair connected to said direct current source so as to be energized to form a polarity opposite said first pole at ends proximate said first side of said permanent magnets, said electromagnet pairs being connected to said direct current source to receive therefrom a direct current to be selectively energized for forming a magnetic field across said permanent magnets for generating circumferentially directed torque; and switching means for selectively energizing one of said electromagnet pairs for generating magnetic driving torque for rotatingly driving said shock absorber via said rotor assembly in a stepwise manner sequentially to a plurality of predetermined positions.

11. A rotary actuator as set forth in claim 10, wherein said actuator is movable between a set number of fixed positions.

12. A rotary actuator as set forth in claim 11, wherein the set number of fixed positions is three.

13. A rotary actuator as set forth in claim 10, wherein one pair of electromagnets is provided for each position of said actuator.

* * * * *